United States Patent [19]

Hengen et al.

[11] 4,362,168

[45] Dec. 7, 1982

[54] SEPARATOR FOR AN AXIAL FLOW ROTARY COMBINE

[75] Inventors: Edward J. Hengen, Bettendorf; James H. Bassett, Davenport, both of Iowa

[73] Assignee: Deere & Company, Moline, Ill.

[21] Appl. No.: 229,688

[22] Filed: Jan. 30, 1981

[51] Int. Cl.$^3$ ............................................... H01F 12/10
[52] U.S. Cl. ............................ 130/27 H; 130/27 HA; 130/27 T
[58] Field of Search ................. 130/27 T, 27 R, 27 H, 130/27 HA, 27 G; 56/14.6

[56] References Cited

U.S. PATENT DOCUMENTS

| | | | |
|---|---|---|---|
| 30,563 | 11/1860 | Colton | 130/27 G |
| 1,736,775 | 11/1929 | Ayers | 130/27 T |
| 4,164,947 | 8/1979 | Wilson | 130/27 T |

FOREIGN PATENT DOCUMENTS

172246 8/1952 Fed. Rep. of Germany .... 130/27 P

*Primary Examiner*—Jay N. Eskovitz

[57] ABSTRACT

In an axial flow rotary separator for a combine, radially extending spike-tooth-like blades are arranged on a rotor body in "reverse" helical arrays, that is, such that helical flighting, similarly disposed, would tend to convey crop material upstream. The helix angles defined by the arrays approximate that of the mean spiral path of conveyance of a crop material mat portion through the separator housing. Propulsion of the crop material mat thus results from a plurality of spaced and staggered engagements of small contact area. The arrays are spaced so that the rotor elements present no extensive wall or front to the crop material thus reducing the tendency to "roping" and separator plugging in tough straw conditions.

17 Claims, 14 Drawing Figures

SEPARATOR FOR AN AXIAL FLOW ROTARY COMBINE

BACKGROUND OF THE INVENTION

This invention concerns axial flow rotary crop material separators and their rotors and particularly the arrangement of crop material engaging elements on such rotors.

Although the term "separating" is properly applied only to "the isolating of detached seed, small debris and unthreshed material from the bulk", the term "separator" is sometimes used rather broadly to cover a crop processing arrangement providing, for example, the functions of receiving or infeeding, threshing, separating, and discharge of straw. "Separator" is sometimes used in this sense in the following.

The general operation of axial flow separators is well known. Typically, a separator housing, including at least one grate portion, surrounds a rotor so as to define an elongated annular space. A feeding arrangement introduces crop material to the upstream end of the annular space. The housing and/or rotor carry crop-engaging elements for displacing the crop material in a downstream direction so that as the rotor rotates, rotor and housing cooperate to propel crop material downstream in a generally spiral path, through threshing and separating stages. Grain and other small fractions leave the housing by passing outward through the grate but most of the straw remains to be discharged from the housing at its downstream end.

The field capacity of combine harvesters using axial flow rotary separators has often been limited by the material handling characteristics of their separators. Especially difficult is the handling of long tough rice straw, particularly in the threshing section. Further, a particular problem inherent in all known arrangements of crop material engaging elements on a rotor is the tendency to "roping" in certain types and conditions of crop material. Tight rolls or ropes of crop material, possibly up to 150 millimeters diameter and 1500 millimeters long, are formed ahead of the crop material-engaging elements of the rotor, in the space between rotor and housing. Typically, ropes form with their axes at any given point approximately perpendicular to the direction of the spiral path in which the crop material is being propelled relative to the housing at that point. No known arrangements of rotor crop-engaging elements have any specific anti-roping characteristic and, in fact, many rotors encourage roping by carrying elements which present quite extensive and continuous surfaces having an orientation not far removed from that of a perpendicular to the "spiral" direction of crop material movement at any particular point. This applies particularly to longer or uninterrupted threshing bars having a helical configuration chosen to contribute directly to axial indexing or downstream conveying of the crop material. Rotor elements offering continuous walls or surfaces of substantial axial extent athwart the spiral path in which material is being propelled provide a wall against which material may be rolled and rope formation may begin. Even though "slippage" occurs (the mean circumferential speed of the crop material mat is less than that of the rotor periphery) incipient ropes are acted upon by successive similarly oriented rotor element surfaces until the rope is of such dimensions as to seriously affect separator performance—grain kernels become entrained in the rope and lost with the straw discharge; the forced slippage of rotor elements over heavy ropes causes high stresses in housing and rotor elements, noisy operation and excessive power consumption; and the roping tendency makes the separator much less tolerant of uneven feeding from the cutting platform or other gatherer of the combine.

Attempts to reduce the roping problem, particularly in rice harvesting in both conventional (circumferential flow at the threshing cylinder) and axial flow threshing sections, have included the use of spike-tooth rotors. However, the spike teeth have been arranged only in axially extending rows or arrays so that collectively, especially if fairly closely spaced axially, they may still present an effective "wall" oriented so as to encourage rope formation especially when used in conjunction with conventional bar-type concaves.

SUMMARY OF THE INVENTION

Accordingly, it is an object of this invention to provide a rotor which positively discourages roping when threshing and separating tough-straw crops, while at the same time including an aggregation of crop material engaging rotor elements sufficient to maintain an acceptable level of separator specific capacity.

According to the invention, a rotor carries a plurality of crop material engaging elements, each one offering only a relatively small engaging surface to the crop material, and arranged so that pairs or sets of neighboring elements do not constitute a configuration itself encouraging rope formation, while at the same time maintaining a preferred effective axial spacing of teeth over the periphery of any unit length of rotor.

In a preferred arrangement, spike-like teeth propel crop material over the housing inner surface including grate or concave portions, with a combing and dragging action. An array of such teeth may be arranged so that side-by-side teeth lie in a portion of a helix approximately parallel to the path in which crop material is propelled in the separator housing. This may be termed a "negative" or "reverse" helix in that it is of opposite hand to a rotor helical element intentionally oriented so as to displace material axially downstream. In such an arrangement there is no massing of teeth in rows generally athwart the spiral flow path so that the roping tendency is reduced. Each tooth engages its portion of crop material mat independently and not in concert with neighboring teeth. The attack is staggered or oblique, rather than frontal. It follows that when more than one helical array is used there should be a substantial space between arrays so that blades in neighboring arrays do not cooperate to present a rope forming front. Given that a regular distribution of elements on a cylinder (rotor) may be interpreted to define more than one spiral direction or array, the concept of "dominating spiral" may be used. From among several spirals implicit in a distribution, the dominant spiral is that in which the elements are most closely spaced. In general, the dominating spiral helps to establish the functional characteristics of the rotor.

Arranged according to the invention, crop material engaging blades or teeth may be mounted individually, directly on a rotor body, or in groups of two or more on mounting pads attached to the rotor body. In another embodiment, crop material engaging blades or teeth may be carried on a plurality of axially extending carriers fixed to a rotor frame or body. Teeth are mounted on the carriers in one or more arrays according to a predetermined effective axial spacing for the teeth considering the total periphery of the rotor. The "negative" helix angle of each array is chosen to be approximately parallel to the mean helix angle (spiral path) in which crop material is propelled through the separator. Mounting particular arrays of blades on mounting pads or carriers detachable from a rotor body provides a convenient way of changing rotor characteristics to suit different crops or crop conditions or to repair a rotor.

In keeping with the invention, each crop material engaging element is preferably in the form of a slender generally radially extending spike. A functionally approximately equivalent form is that of a generally circumferentially extending blade of sufficient circumferential extent at its base to provide strength and stability for the element while permitting the use of conventional and economical methods of fabrication and assembly. Preferably the leading edge of such a blade should be somewhat rearwardly inclined in terms of direction of rotor rotation.

Rather than rely entirely on guide vanes on the internal surface of the housing, crop material engaging surface or surfaces of the elements (of blade form for example) may be angled so that in the combing and slipping action of a rotor so equipped, the elements tend to deflect crop material downstream thus contributing to the total axial indexing effect of the separator. However, element engaging surface width and departure from the circumferential direction must be limited so as to minimize the potential for roping or rope formation which derives from crop material engaging surfaces of significant extent lying athwart the direction of material conveying. With the blades angled in this way the function of the reverse helix array is analogous to that of a moldboard plow. A positive helix arrangement would be analogous to a side delivery rake.

A crop material engaging element arrangement according to the invention is adaptable for use in a rotor in conjunction with other types of crop material engaging elements, for example, with approximately axially extending threshing bars of the conventional rasp bar type. The rotor may carry arrays of spikes or blades, disposed according to the invention, between circumferentially spaced threshing bars and, in appropriate combinations, the "reverse helix" of the rotor between the threshing bars may correct or compensate for any initiation of roping caused by the conventional threshing bars. The slip or relative motion between the rotor periphery and crop material mat which occurs in normal operation results in each portion of the mat being successively engaged by the conventional threshing bars and the reverse helix portion.

In another embodiment of the invention, the reverse helix principle is applied to the arrangement of crop material engaging blades in the separating portion of a rotor (downstream of the threshing portion). Here, because of the tearing and breaking of straw which will have occurred in the threshing section, the tendency for roping is reduced, permitting, if desired, the use of wider blades, having their frontal blade surfaces oriented substantially athwart the spiral path of material flow so as to optimize separating function while contributing to the axial displacement downstream of the crop material mat.

DESCRIPTION OF THE PREFERRED EMBODIMENT

Figure 1:
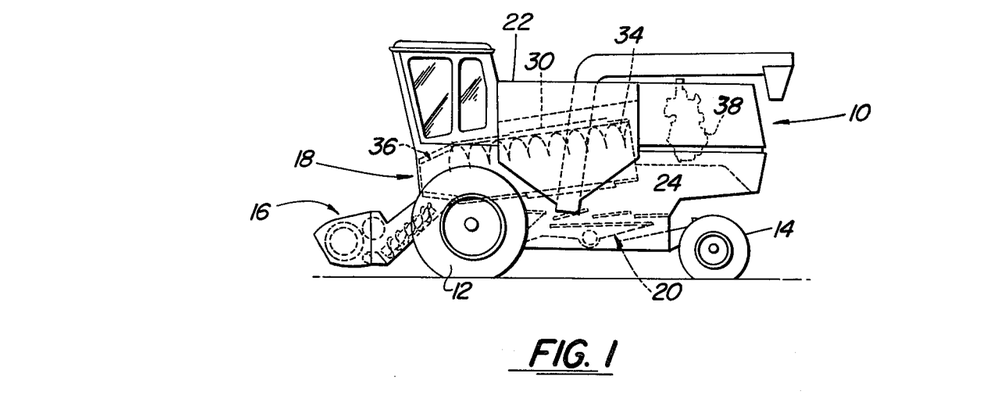
FIG. 1 is a semi-schematic left side elevation of a self-propelled axial flow combine harvester having a separator rotor embodying the invention.

The invention is embodied in a self-propelled axial flow rotary combine shown semi-schematically in FIG. 1. The general structure and operation of such combines is well known. In this case, a mobile body 10 is supported on pairs of front and rear wheels, 12 and 14 respectively. A forward mounted header 16 gathers crop material from a field and feeds it to a generally fore-and-aft disposed axial flow rotary separator 18. Threshed and separated grain passes downwards to a conventional cleaning shoe 20 and, after cleaning, to a clean grain tank 22. Straw is discharged from the downstream end 24 of the separator 18.

The separator 18 includes a generally cylindrical housing 30 incorporating at least one grate or concave portion 32 (see especially FIG. 5) and carrying on its upper inner surface a series of helically disposed guide vanes 34. The separator rotor 36 is concentrically and rotatably supported in the housing and it and other components of the combine harvester are powered by an engine 38 through conventional drive systems not shown in the drawings. In this embodiment the separator axis lies fore-and-aft with respect to the body 10, but the invention is not limited to any particular separator axis orientation as will be apparent from the following description.

The rotor 36 is differentiated functionally into infeed or receiving 40, threshing 42, and separating 44, portions. The rotor frame or body 46 is generally cylindrical except for a frusto-conical infeed body portion 48. The rotor infeed portion 40 receives crop material from the header 16 and engages and deflects it axially downstream, in part at least, by means of helically disposed flights such as that indicated in phantom outline at 50 in FIG. 2. The downstream ends 52 of such flights slightly overlap the threshing portion 42.

Figure 2:
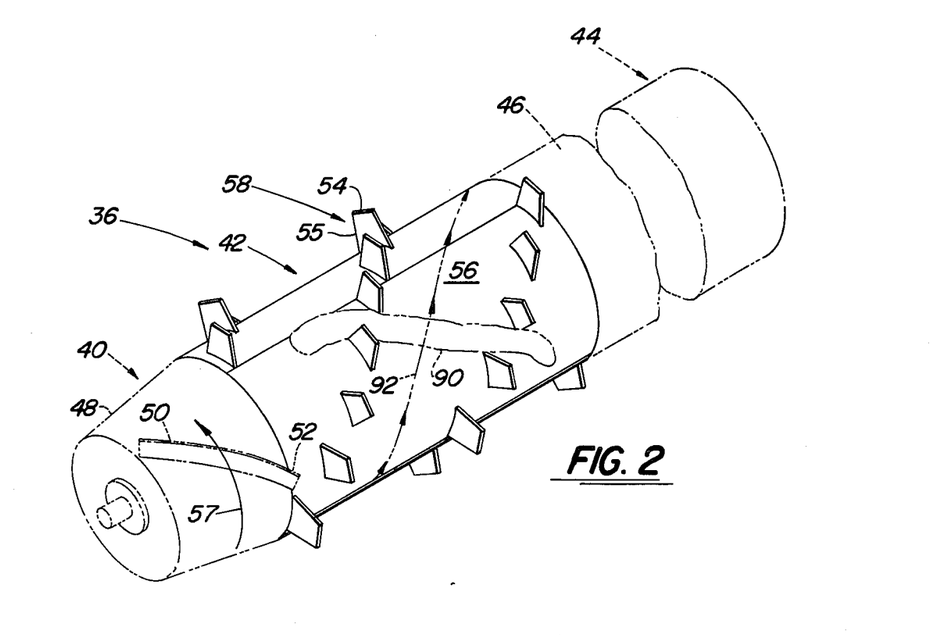
FIG. 2 is an enlarged front three-quarters perspective view of a threshing portion of the rotor with the remainder of the rotor shown in phantom outline only.
Figures 3, 4A:
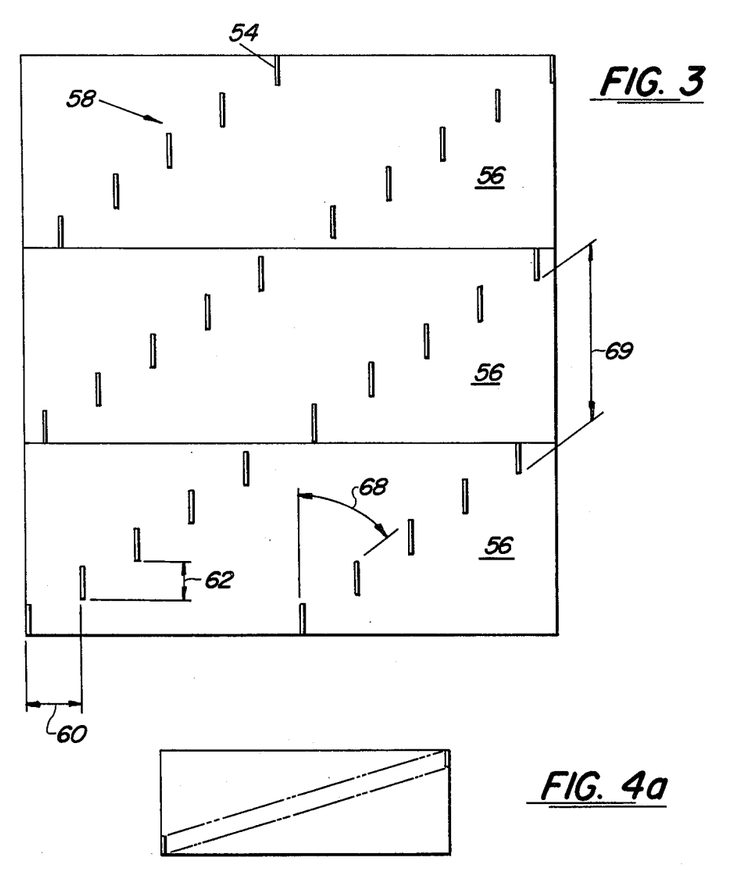
FIG. 3 is a flat pattern development of the threshing portion body surface of the rotor of FIG. 2 showing the disposition of the plurality of arrays of crop material engaging elements.
FIGS. 4a, b and c show, in schematic outline, a selection of alternative arrangements of arrays of crop material engaging elements on rotor surface portions. The arrangement of FIG. 4b corresponds to that of the lower portion of FIG. 3.

In the threshing portion 42, a plurality of spike-tooth-like blades 54 are rigidly mounted on the rotor body in helical arrays. Each blade has a leading edge 55 somewhat rearwardly inclined from the radial in terms of rotor rotation as indicated by arrow 57 in FIG. 2. It is convenient to describe the arrangement of the blades 54 as if they were carried on three equal arcuate axially extending blade carriers 56 attached to the rotor body 48, as indicated in FIGS. 2 and 3. Such an arrangement would of course provide a means of changing rotor characteristics by removing and attaching carriers with different blade types and arrangement. The complete periphery of the threshing portion 42 of the rotor is depicted semi-schematically in flat pattern in FIG. 3 where it can be seen that each carrier 56 carries two similar arrays 58 of blades 54. In all the arrays 58, the blades 54 are equally axially and circumferentially spaced, one from another, the individual spacing being indicated in FIG. 3 by the numerals 60 and 62, respectively. However, the axial disposition of the respective arrays 58 on each juxtaposed carrier 56 is offset one-third of the axial space 60 so that, overall, the blades 54 are equally axially spaced with each blade occupying a unique axial position. In general, the anti-roping effect of the invention is best realized when the number of teeth is no more than necessary to achieve an acceptable threshing efficiency. Maintaining a certain minimum desirable axial spacing within this tooth population typically results in the arrangement just described, where any given circumferentially extending portion of the separator housing wall is swept by only one rotor tooth.

Figure 10:
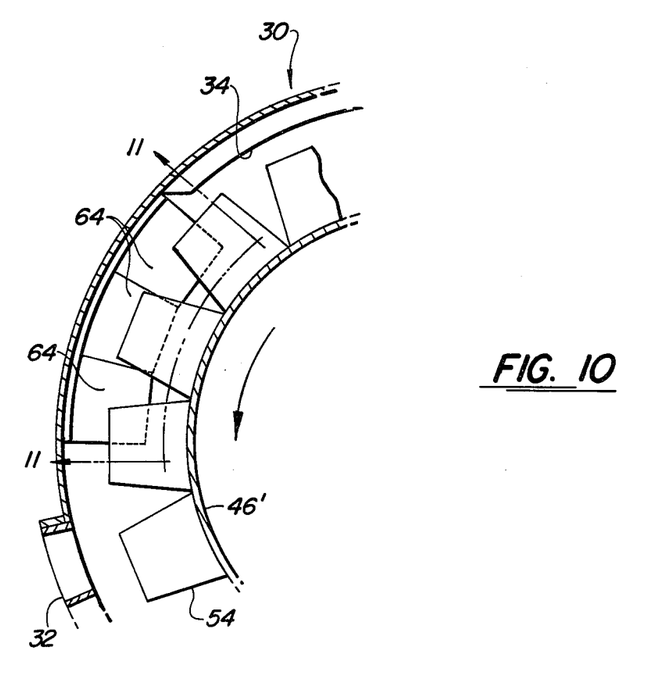
FIG. 10 is an enlarged partial view similar to a portion of FIG. 5 showing an alternative embodiment of the invention having fixed blades in the separator housing.
Figure 11:
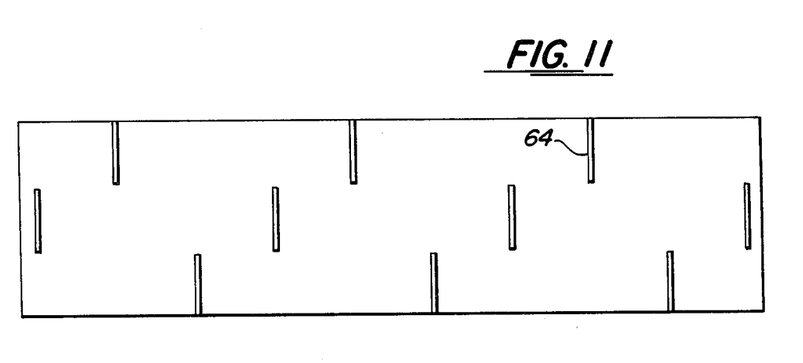
FIG. 11 is a diagrammatic partial view approximately on line 11—11 of FIG. 10 showing the fixed blade disposition.

Tooth arrangements such as those shown in FIGS. 2 and 3, are compatible with the optional provision of fixed teeth 64 adjacent the inner surface of the grate 32 as indicated in FIGS. 10 and 11. Preferably, the teeth 64 are arranged in staggered formation so as to inhibit roping, as shown in FIG. 11, for example, and spaced axially so that at least one rotor tooth 54 passes close to each fixed tooth 64. Interaction between these teeth 64 and the rotor elements 54 supplements and intensifies the threshing action produced between the elements 54 and the grate 32.

Figure 4B:
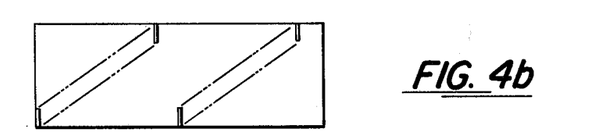
Figure 4C:
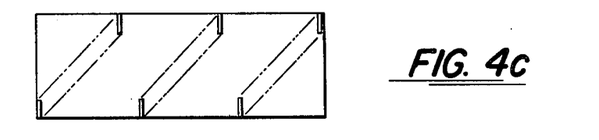

With respect to direction of rotor rotation and axial indexing (downstream), blade arrays such as the array 58 (FIGS. 2 and 3) constitute a reverse helix arrangement, so called because if, for example, continuous flighting elements were substituted for each of the blade arrays 58, crop material engaged by such elements would be urged axially upstream rather than downstream. The effective negative or reverse helix angle (definition of helix angle here is indicated at 68 in FIG. 3) is an important characteristic of the invention. A desirable helix angle is determined in large part by and preferably should be approximately equal to the mean helix angle of the helical or spiral path followed by the crop material mat as it is propelled through the housing. Given that there are also preferred ranges of the axial and circumferential blade spacings 60 and 62 respectively, and of the circumferential spacing between the arrays of blades 58 (see 69 in FIG. 3 for example) the number (and angular disposition) of blade arrays 58 on the rotor body 46, or portions of the body represented by the carriers 56, may be chosen to give the best approximation to the desired helix angle. Some possible arrangements are indicated diagrammatically in FIGS. 4a–c. The arrangement of FIG. 4b corresponds to the embodiment shown in FIGS. 2 and 3. It should be noted that, in this type of arrangement, although unique paths described by adjacent rotor elements such as the blades 54 may be quite closely spaced axially, the elements describing them may be relatively widely spaced circumferentially. This sort of dispersion helps reduce torque peaks which result from interaction with circumferentially localized elements of the separator housing 30 such as the concave 32 or group of optional fixed teeth 64.

Figure 6:
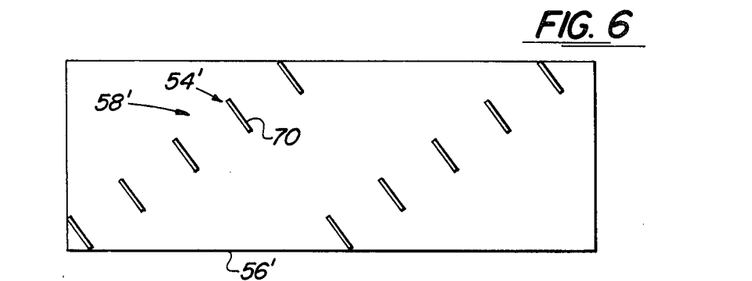
FIG. 6 is a partial view similar to FIG. 3 showing an alternative embodiment in which blade-like crop material engaging elements are angled so as to deflect crop material axially downstream.

In an alternative rotor embodiment, partially illustrated in FIG. 6, blades 54' in arrays 58' on a carrier 56' may be angled so that their frontal surfaces 70 deflect or urge engaged crop material downstream to supplement the similar effect of the guide vanes 34. (This arrangement is analogous to the moldboard plow.)

Figure 5:
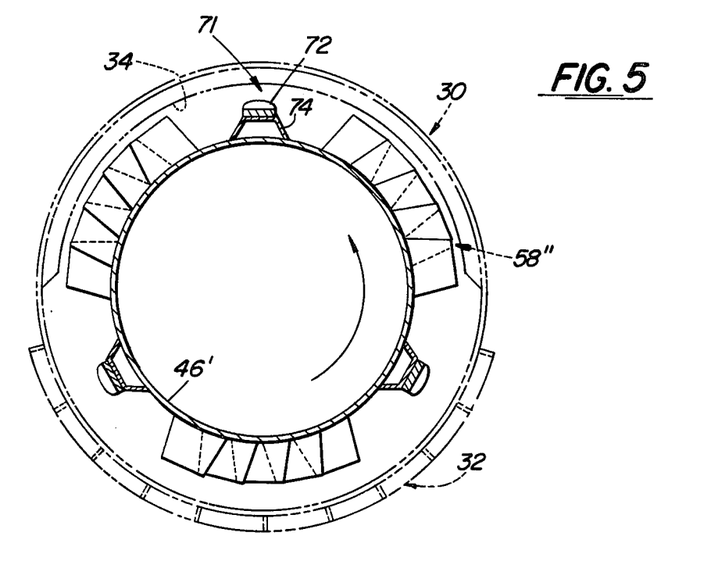
FIG. 5 is an enlarged schematic cross-sectional view of a separator having a rotor including an alternative embodiment of the invention, similar to a view approximately on line 5—5 of FIG. 7.
Figure 7:
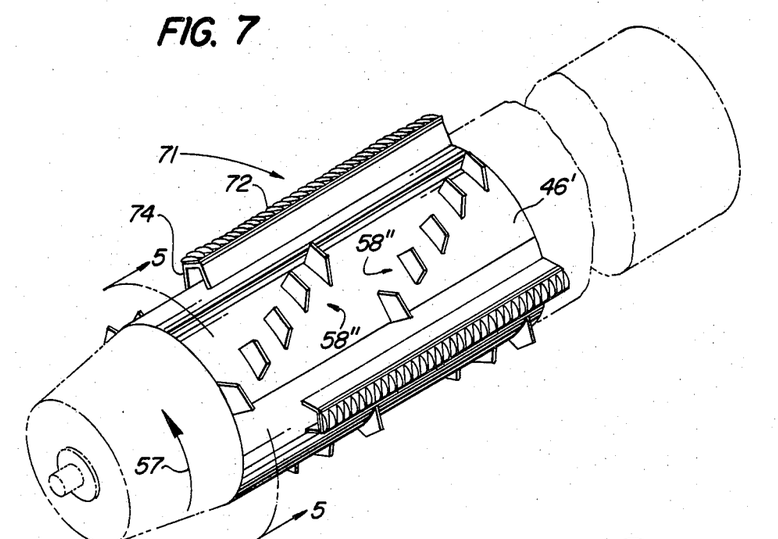
FIG. 7 is a view similar to FIG. 2 of an alternative embodiment of the invention in which the rotor threshing portion includes conventional threshing bars.

In another embodiment of the invention, illustrated in FIGS. 5 and 7, reverse helix blade arrays are used in combination with another type of functional element such as the conventional axially disposed threshing bar assembly 71. Here, three equally spaced threshing bar assemblies 71 each include a rasp bar 72 spaced radially outward from the rotor body 46' by a rasp bar support 74 carried by the body 46'. Between the threshing bar assemblies 71 are blade arrays 58" similar to those of the embodiment of FIG. 2 but of smaller circumferential extent.

Figures 8, 9:
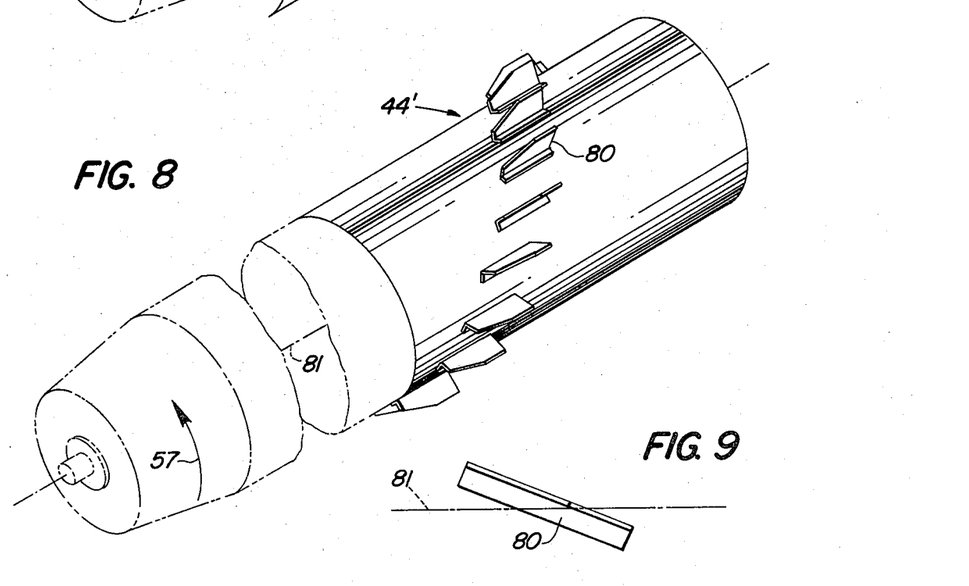
FIG. 8 is a front, three-quarter, semi-schematic perspective view of the downstream or separating portion of a rotor carrying blades arranged according to the invention.
FIG. 9 is an enlarged view of one of the separator blades of FIG. 8, angled with respect to the rotor axis.

In FIG. 8, the reverse helical arrangement of separator blades 80 in the separator portion 44' of a rotor represents another application of the invention. Here again, as indicated in FIG. 9, the individual blades 80 may be angled with respect to the rotor axis 81 so as to contribute to the downstream axial indexing of crop material.

In operation, raised crop material engaging elements mounted on a rotor in a suitable reverse helix arrangement, (for example, in one of the forms described above) inhibit roping or rope formation of tough crop material as the rotor propels contiguous portions of crop material mat in a generally spiral path through the separator housing 30. In conventional rotor configurations which permit rope formation, rope disposition and length may typically be as indicated in phantom outline at 90 in FIG. 2. The rope tends to form with its axis athwart or approximately perpendicular to the mean spiral path followed by the contiguous portion of crop material mat through the housing 30. The direction of such a path relative to the housing is suggested by the line 92 in FIG. 2. A spiral is, of course, of a particular "hand", either left hand or right hand, analogous to a screw thread. The spiral indicated by the numeral 92 would, conventionally, be described as left hand. As indicated in FIG. 2 and as explained above, a blade array arrangement in which adjacent array portions are substantially spaced, which approximately parallels the mean spiral direction of crop material flow through the housing (and hence is of the same hand) and in which the form of the crop material engaging elements themselves offer minimum frontal surface for engagement with the crop material, minimizes the creation of rope formation conditions. The crop material is acted upon only at dispersed and spaced staggered point locations rather than along a broad frontal surface.

Within the scope of the invention, a wide range of dimension and relative proportion of cooperating elements may be used, but, of course, the dominating spiral concept defined above must be adhered to. The proportions shown in the drawings have given good results. Thus in the clearly dominating spiral pattern (FIG. 3 for example), the circumferential spacing 69 of the arrays 58 is substantially greater than the spacing 60 of the blades 54 in the arrays. Similarly, the width of the clear space or lane between arrays is substantially greater than the width of the spiral rib-like envelope defined by the blades of each array. For example, good experimental results have been obtained with ratios of the respective spacings and widths of not less than about two to one and preferably about three to one. To maintain a functionally significant dominant spiral the circumferential extent of the rotor elements must not of course be too great. Preferably the circumferential span should be no greater than the spacing of the elements within the array. Examples of related separator dimensions which have been tested successfully include: a rotor of 650 mm nominal diameter carrying blades 54 of 75 to 90 mm height and having a radial clearance from blade tip to housing 30 of 35 to 50 mm and cooperating with guide vanes 34 approximately 25 mm high. In a combination of threshing bar and reverse helix blade arrays, as shown in FIG. 5, radial clearances from the housing 30 and grate 32 of the blades 54 and threshing bars 72 may be of the order of 35 and 50 mm respectively. Rearward inclination of the leading edges 55 of the blades 54 are of the order of 15 degrees or more.

Figure 12:
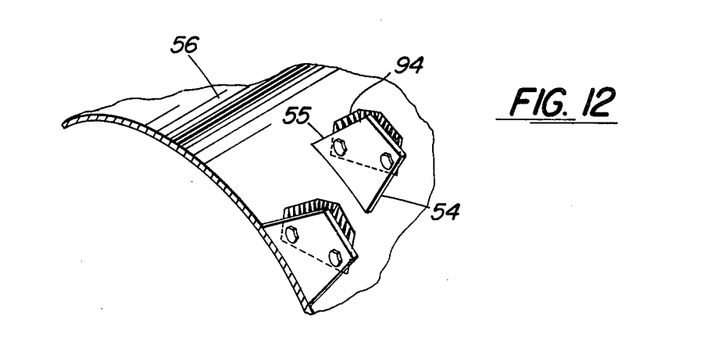
FIG. 12 is a partial view, similar to a part of FIG. 2, showing knife sections attached to rotor blades.

The anti-roping characteristic may be enhanced by attaching knives 94 to the teeth 54 as shown in FIG. 12 to cut the crop and reduce straw length, thus further reducing any roping tendency. In the exemplary embodiment of FIG. 12, the knife 94 is a conventional serrated edge sickle section as used in a reciprocating sickle bar mower, mounted so that both the leading and circumferential edges of the blade 54 are modified to become cutting edges.

We claim:

1. In an axial flow rotary separator for a combine having an upstream receiving portion, a downstream discharge portion and at least one intermediate processing portion, and including an at least partially foraminous housing having internal angled guide vanes, and a rotor having a body approximately coaxial with the housing, rotatably mounted within the housing for engaging crop material delivered to the receiving portion and cooperating with the housing to propel the crop material downstream through the housing in a generally helical path and process it so that a portion of the crop material passes outward through the foramina of the housing as the rotor rotates, the improvement in the rotor comprising:

a plurality of axially and circumferentially spaced raised elements associated with the processing portion of the separator and carried by the rotor body in an array approximately defining at least a portion of a rib-like helix on the body, said helix being approximately coaxial with the rotor and of the same hand as the helical path in which the crop material is propelled through the housing, said elements having a maximum circumferential dimension not greater than about equal to their spacing within the array and the rotor having a substantially clear space on the rotor body extending a substantial distance on both sides of the array.

2. The rotor improvement of claim 1 wherein the helix angles of the array of the raised elements and of the path of the crop material are approximately equal.

3. The rotor improvement of claim 1 where each element extends outwards from the rotor body and has a spike-tooth-like form.

4. The rotor improvement of claim 1 wherein each raised element extends outwards from the rotor body and has the form of a generally radially and circumferentially extending blade of short circumferential extent.

5. The rotor improvement of claim 1 wherein at least one raised element includes a crop material engaging surface angled so as to deflect downstream crop material engaged by it as the rotor rotates.

6. The rotor improvement of claim 1 wherein each raised element extends outwards from the rotor body in the form of a short, narrow blade having a blade angle tending to deflect downstream crop material engaged by the blade as the rotor rotates.

7. The rotor improvement of claim 1 and further including a plurality of knife-like attachments carried by the raised elements for cutting the crop material.

8. In an axial flow rotary separator for a combine having a rotor including a frame, and a housing including a threshing grate and surrounding the rotor so as to define an annular space, the housing carrying on its inside surface guide elements angled and disposed so that they engage crop material introduced into the annular space and propelled circumferentially by the rotor and deflect it so that rotor and housing cooperate to propel the material downstream in a generally spiral path, an improved threshing section for the rotor, registering with the threshing grate, and comprising:

a plurality of axially and circumferentially spaced raised crop material engaging elements for cooperating with the threshing grate to thresh crop material, carried by the frame in an array defining at least a portion of a rib-like spiral, said spiral being angled in the same direction as the guide vanes and said elements having a maximum circumferential dimension not greater than about equal to their spacing within the array and the rotor having a substantially clear space on the rotor body extending a substantial distance on both sides of the array.

9. The threshing section of claim 8 and further including a second array of crop material engaging elements spaced from and approximately parallel to the first array, said elements and arrays being disposed so that overall, crop material engaging elements are distributed approximately uniformly per unit of length and of circumference of the threshing section of the rotor.

10. An axial flow rotary separator for a combine comprising:

a rotor having a body and an upstream feed section, a downstream separating section and an intermediate threshing section, the threshing section including a plurality of circumferentially juxtaposed material control portions, each of said portions including at least two arrays of axially spaced raised spike-tooth-like elements carried by the body, each array defining approximately, with respect to the rotor periphery, a portion of a rib-like helix such that, with respect to rotor rotation and pairs of juxtaposed blades, in any pair of blades a rotationally leading blade is disposed downstream of a rotationally trailing blade, said elements being distributed so that the circumferential spacing of the arrays is substantially greater than the axial spacing of the elements within the arrays and so that there is a substantially clear space on the rotor between arrays, said space having a width substantially greater than the width of the rib-like helix defined by the elements in the array;

means for rotatably mounting and rotating the rotor; and an at least partially foraminous separator housing surrounding the rotor and carrying on an inner surface a plurality of raised helically disposed crop material guide elements, the guide elements at least partially axially overlapping the threshing section and the rotor and housing cooperating to define an annular space so that as the rotor rotates, crop material introduced into the upstream end of the annular space is engaged by the rotor and the guide elements and propelled downstream in a generally spiral path.

11. The separator of claim 10 further including at least one generally axially extending raised functional bar carried by the rotor body between a pair of material control portions.

12. The separator of claim 11 wherein the functional bar has a radially outward surface, said surface comprising a threshing element.

13. The separator of claim 10 wherein the circumferential path described by each raised element of the plurality of material control portions is distinct and axially spaced from the paths of all other such elements.

14. The separator of claim 10 and further including a plurality of axially spaced spike-like teeth carried by and extending inwards from the separator housing, each of said teeth being disposed intermediate between respective circumferential paths described by the elements carried by the rotor and radially overlapping said elements.

15. The rotor improvement of claim 1 wherein the width of the clear space is not less than about equal to three times the width of the rib-like helix defined by the elements in the array.

16. The threshing section of claim 8 and further including a second array of crop material engaging elements spaced from and approximately parallel to the first array, the elements being distributed so that the circumferential spacing of the arrays is about three times the axial spacing of the elements in the arrays and so that the width of the clear space between arrays is about equal to three times the width of the rib-like spiral defined by each array.

17. The separator of claim 10 wherein the circumferential spacing of the arrays is not less than about twice the axial spacing of the elements in the arrays and the width of the clear space between the arrays is not less than about twice the width of the rib-like helix defined by the elements in the array.

* * * * *